ized. Patent Number: 5,446,093

United States Patent [19]
Hoxmeier et al.

[11] Patent Number: 5,446,093
[45] Date of Patent: Aug. 29, 1995

[54] METHOD FOR PRODUCING STATISTICALLY COUPLED ASYMMETRIC RADIAL POLYMERS

[75] Inventors: Ronald J. Hoxmeier; Bridget A. Spence; Steven S. Chin, all of Houston; Michael A. Masse, Richmond, all of Tex.

[73] Assignee: Shell Oil Company, Houston, Tex.

[21] Appl. No.: 150,929

[22] Filed: Nov. 10, 1993

[51] Int. Cl.⁶ .................. C08L 53/02; C08F 297/04
[52] U.S. Cl. ........................... 525/89; 525/98; 525/100; 525/102; 525/105; 525/194; 525/250; 525/254; 525/255
[58] Field of Search ............. 525/314, 105, 101, 100, 525/89, 98, 102

[56] References Cited

U.S. PATENT DOCUMENTS

| | | | |
|---|---|---|---|
| 3,244,664 | 4/1966 | Zelinski et al. | 525/102 |
| 3,692,874 | 9/1972 | Farrar et al. | 525/105 |
| 3,725,369 | 4/1973 | Halasa et al. | 525/316 |
| 4,076,915 | 2/1978 | Trepka | 525/338 |
| 4,092,375 | 5/1978 | Vreugdenhil | 525/314 |
| 4,163,764 | 8/1979 | Nash | 525/93 |
| 4,391,949 | 7/1983 | St. Clair | 525/99 |
| 4,444,953 | 4/1984 | St. Clair | 525/98 |
| 5,147,939 | 9/1992 | Hellermann et al. | 525/314 |
| 5,212,249 | 5/1993 | Richie et al. | 525/105 |
| 5,229,464 | 7/1993 | Erickson et al. | 525/314 |
| 5,360,875 | 11/1994 | Masse et al. | 525/314 |

FOREIGN PATENT DOCUMENTS 0314256  5/1989  European Pat. Off. .

*Primary Examiner*—James J. Seidleck
*Assistant Examiner*—M. L. Warzel
*Attorney, Agent, or Firm*—Donald F. Haas

[57] ABSTRACT

A process is disclosed for producing six-armed and eight-armed asymmetric radial block copolymers. The process comprises anionically polymerizing a diene and/or a vinyl aromatic hydrocarbon to create living polydiene and/or vinyl aromatic hydrocarbon arms, sequentially anionically polymerizing a vinyl aromatic hydrocarbon and a diene to create living block copolymer arms and coupling the two sets of arms together in one step with a coupling agent that will couple six or eight arms, wherein the molar ratio of the vinyl aromatic hydrocarbon-diene arms to the polydiene arms is sufficient to produce a statistical blend with less than 5 weight percent homopolydiene.

5 Claims, 3 Drawing Sheets

METHOD FOR PRODUCING STATISTICALLY COUPLED ASYMMETRIC RADIAL POLYMERS

BACKGROUND OF THE INVENTION

The present invention relates to a method for producing asymmetric radial polymers. More particularly, this invention relates to a method for producing asymmetric radial polymers having 6 to 8 vinyl aromatic hydrocarbon-conjugated diene copolymer arms and conjugated diene homopolymer arms and/or vinyl aromatic hydrocarbon homopolymer arms.

Heretofore, several methods have been proposed for preparing asymmetric radial polymers. As is well known in the prior art, radial polymers comprise three or more arms extending outwardly from a nucleus. The asymmetric radial polymers contain arms of at least two different polymers, which polymers may vary as to chemical composition, structure and/or molecular weight. A principle difference in the methods frequently used to prepare asymmetric radial polymers resides in the selection of a coupling agent which forms the nucleus of the radial polymer. Multifunctional coupling agents such as silicon tetrachloride have been used to form asymmetric radial polymers having three or four arms. Star-shaped radial polymers having many more arms have been formed using a poly alkenyl aromatic compound, such as divinyl benzene, as the coupling agent as described in Canadian Patent 716,645.

Before 1988, such asymmetric radial polymers were made by forming a blend of the different polymeric arms and then adding the coupling agent to couple the arms to the coupling agent. Those methods resulted in a product having, on average, the desired number of each kind of arm in the asymmetric polymer. The problem associated with producing asymmetric polymers in that manner is that the product obtained is actually a statistical distribution of all possible products. Unfortunately for enduses such as adhesives, this means that a certain percentage of the polymer produced would constitute a homopolymer polydiene radial polymer. If the overall polymer contains more than 5 weight percent of such homopolymer, it will be unsuitable for use in adhesive formulations because the polydiene homopolymer is mobile, bleeds to the surface of an adhesive formulation and thus adversely effects that adhesion of the formulation.

In 1988, one of the present applicants filed a patent application which resulted in the publication of European Patent Application 0,314,256. Therein is disclosed a two-step process for producing asymmetric radial polymers which avoids the problem of the production of the unwanted homopolydiene polymer. The process involves separately polymerizing the monomers to create separately the two different types of arms. Then one of the polymeric arms is coupled to the coupling agent and when that coupling reaction is complete, the second set of polymer arms is coupled to the coupling agent. This insures that there will be very little homopolydiene in the final polymer. The two-step process described above is very advantageous and produces polymers which have very good properties and are useful in adhesive compositions and for a wide variety of other uses. However, the two-step process does have the disadvantage that it is more expensive to carry out. It requires additional capital expenditure for a second reactor and additional time to produce the final polymer. Therefore, it would be very advantageous to have a method which was capable of producing in one step an asymmetric radial polymer which contains little or no homopolymer polydiene. The present invention provides such a process and produces such a polymer.

SUMMARY OF THE INVENTION

The present invention is a process for producing an asymmetric radial block copolymer statistical blend comprised of radial polymers having 6 or 8 arms and comprised of arms of a polydiene and/or a polyvinyl aromatic hydrocarbon and arms of a block copolymer of a vinyl aromatic hydrocarbon and a diene. This radial block copolymer statistical blend contains less than 5 percent by weight of homopolydiene. The process comprises:

(a) sequentially anionically polymerizing a vinyl aromatic hydrocarbon and a diene to create living arms comprised of polyvinyl aromatic hydrocarbon blocks and polydiene blocks, (b) anionically polymerizing a diene and/or a vinyl aromatic hydrocarbon to create living polydiene arms and/or vinyl aromatic hydrocarbon arms, and (c) coupling the arms of (a) and (b) together in one step with a coupling agent that will couple 6 or 8 arms, wherein the molar ratio of the arms of (a) and (b) is sufficient to produce a statistical blend with less than 5 weight percent homopolydiene. The present invention also encompasses the product produced by this process. The preferred vinyl aromatic hydrocarbon is styrene and the preferred diene is isoprene.

DESCRIPTION OF THE INVENTION

The block copolymers of the present invention have an idealized structure as follows:

$(A_n\text{-}B_m)_x\text{-}Y\text{-}(C)_z$

The subscripts x and z range from 0 to 6 or 8 and x+z must be 6 or 8 for the polymers that make up the statistical blend which is created. n and m can be 0 or 1 but n+m must be at least 1. The A blocks are polymer blocks of a vinyl aromatic hydrocarbon. Preferably, the vinyl aromatic hydrocarbon is styrene. Other useful vinyl aromatic hydrocarbons include alphamethyl styrene, various alkyl-substituted styrenes, alkoxy-substituted styrenes, vinyl naphthalene, vinyl toluene and the like. The B and C blocks are polymer blocks of conjugated dienes. Preferred dienes include butadiene and isoprene, with isoprene being much preferred. Other dienes may also be used, including piperylene, methylpentyldiene, phenylbutadiene, 3,4-dimethyl-1,3-hexadiene, 4,5-diethyl-1,3-octadiene and the like, preferably those conjugated dienes containing 4 to 8 carbon atoms. While the conjugated diene employed in the B block may differ from that employed in the C block, it is preferred that the same diene be employed in both blocks. Mixtures of conjugated dienes may also be employed.

The Y moiety stands for the multifunctional coupling agent used herein. The coupling agent of the present invention may be $X_3Si-(CH_2)_n-SiX_3$ where $n \geq 0$ and X is halogen, alkoxy, hydride, including bis-trimethoxysilylethane, bis-trichlorosilylethane, 1,6-bis(trichlorosilyl)hexane or hexachlorodisiloxane and hexachlorotriphosphazine to make 6 armed polymer blends, and octachlorotrisiloxane to make 8 armed polymer blends. The preferred coupling agent is bis-trichlorosilylethane because it gives the highest coupling yield. The use of these coupling agents allows the production of the desired 6 or 8 armed asymmetric radial polymers of the present invention. These particular coupling agents are advantageous because when they are used, the coupling reaction can be made to produce less than 5 percent homopolydiene.

The letters x and z stand for the relative number of arms in each polymer molecule. In the polymers made according to the present invention, x+z is 6 or 8. x and z are integers when referring to a single polymer molecule. However, a polymer mass will necessarily contain molecules of varying functionality. With regard to the present invention, it is important that, for the average polymer molecule in the polymer mass, that x and z be 3 plus or minus 2 and that their total be 6 for 6 armed polymer statistical blends. Utilizing the formula set forth above, a preferred statistical polymer to be made according to this invention would have the average structure:

$(S-I)_3-Y-(I)_3$ where S is styrene and I is isoprene.

In general, the method of this invention may be used to prepare asymmetric radial polymers with any polymer containing a reactive end group which will react with one or more functional groups contained in the selected coupling agent. The method is particularly suitable for the preparation of asymmetric radial polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of asymmetric radial polymers using "living" polymers to form the arms thereof, the invention will be described by reference to such polymers. It will, however, be appreciated that the invention would be equally useful with polymers having different reactive groups so long as the selected coupling agent contains functional groups which are reactive with the reactive site contained in the polymer.

Living polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in both the method of this invention and the asymmetric radial polymer of this invention may be prepared by contacting the monomer or monomers with an organoalkali metal compound in a suitable solvent at a temperature within the range from -150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

In general, the polymers useful as arms in both the method of this invention and the asymmetric radial polymer of this invention will have a GPC peak molecular weight within the range from 1000 to 250,000 and when the polymer is a copolymer of one or more conjugated diolefins and one or more other monomers, the copolymer will comprise from 1%wt to 99%wt monomeric diolefin units and from 99% wt to 1% wt monoalkenyl aromatic hydrocarbon monomer units. In general, the different polymer arms will be prepared separately but contacted simultaneously with the coupling agent.

In general, the living polymers used as arms in the asymmetric radial polymer will be contacted with the coupling agent at a temperature within the range from 0° C. to 100° C. at a pressure within the range from 0 bar to 7 bar and the contacting will be maintained until reaction between the arms and the coupling agent is complete or at least substantially completed, generally for a period of time within the range from 1 to 180 minutes. While the inventors do not wish to be bound by a particular theory, it is believed that the method of this invention results in an improved relative arm distribution because the reactivity of the functional groups contained in the coupling agent stays relatively high as the number of functional groups contained in the coupling agent is reduced as the result of reaction with the metal-carbon bond contained in the living polymer. This allows the coupling reaction to take place quickly. EP 0,314,256 describes a different phenomenon.

In general, the polymers useful as arms in the asymmetric radial polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the asymmetric radial polymers of this invention will contain a single terminal reactive group, the polymers used in preparation of the asymmetric radial polymers will be retained in solution after preparation without deactivating the reactive (living) site. In general, the coupling agents may be added to a solution of the polymer or a solution of the polymer may be added to the coupling agent.

There are at least three methods for making statistically coupled radial polymers which have vinyl aromatic hydrocarbon and/or conjugated diene arms and arms which have a block of a vinyl aromatic hydrocarbon and a block of a conjugated diene. For convenience hereafter, conjugated dienes will be referred to collectively as isoprene or I and vinyl aromatic hydrocarbons will be referred to as styrene or S.

The conventional method for making statistically coupled radial polymers creates isoprene blocks with identical molecular weight in both the SI and I arms. First, the styrene block is made by anionically polymerizing styrene with an initiator, for example, s-butyllithium, to create the living polystyryl polymer chain S−Li+. Eventually, all the styrene will be polymerized and then more s-butyllithium is added and then isoprene monomer is added. The isoprene monomer will homopolymerize as well as copolymerize on the end of the polystyryllithium living polymer chain. When the polymerization is complete, the polymer cement contains SI−Li+ and I−Li+. The ratio of SI−Li+ to I−Li+ depends upon the ratio of first added initiator to second added initiator. The coupling agent is then added to the mixture and coupling conditions are imposed on it wherein the arms will statistically couple to form a variety of polymers. In the case of a hexafunctional coupling agent, 6 unique components will be created ranging all the way from polymers having all SI arms to those having all I arms. The concept herein is to minimize the amount of homopolymer (all I arms) created while making a polymer which has useful properties. However, it is quite possible and may be very useful to make polymers with mope homopolymer.

The next method for making these polymers starts out the same as the first, i.e., polymerizing styrene to form the polystyryllithium living polymer chain. Next, isoprene monomer is added. The isoprene monomer will polymerize on the end of the polystyryllithium to form SI block copolymer arms. After a time, more s-butyllithium is added and then the isoprene can also polymerize with itself to form hompolymer I arms. This will create polymers wherein the homopolymer I arms have a molecular weight lower than the I block in the SI arms. For example, if the s-butyllithium is added after one-half life ($t_{\frac{1}{2}}$) of isoprene polymerization, the molecular weight of the hompolymer isoprene arms will be one-third of the molecular weight of the isoprene blocks in the SI arms for equal additions of initiator. When the polymerization is complete, the coupling agent is added and the polymer arms are statistically coupled as described above.

In a variation of the second method the isoprene monomer in the above example could be added in two charges. The SI block would be made by adding one-half of the total isoprene charge and then polymerizing those monomers to completion. Then s-butyllithium and the other half of the isoprene monomer would be added to grow the SI and I arms in parallel. Then they would be statistically coupled. The product produced should be identical to that produced by the preceding method and the method should be easier to control because a precise measure of $t_{\frac{1}{2}}$ is not required.

Another possible method for making these polymers would be to make the SI and I arms in separate reactions, most likely in separate reactor vessels. This way, the isoprene block molecular weights of the SI and I arms could be made the same or different. Any variation of molecular weight would be possible. Then, the two sets of arms would be combined in one reactor at an appropriate arm ratio, the coupling agent added and the statistically coupled polymers could then be recovered.

As described above, these methods produce a variety of polymers with a relative distribution of different arms in an asymmetric radial polymer. Herein, we are concerned with radial polymers having 6 or 8 arms. In order to ensure that the relative number of the two different types of arms in the statistically coupled polymers will be the desired value, the molar ratio of the two different types of arms in the coupling reaction mixture must be controlled. For example, if one is trying to make an 8 armed asymmetric radial polymer wherein the ratio of the two different types of arms is approximately 1:1, then the molar ratio of the SI and I arms added to the coupling reaction mixture should be 4:4. If one wanted to make a 6 armed asymmetric radial polymer wherein the ratio of SI arms to I arms is approximately 2:1, then the molar ratio of the SI arms to I arms added to the coupling reaction should be 4:2.

In general, it is preferable to control the ratio of arms in the final polymer such that the total amount of homopolymer (all I arms) produced is less than 5 percent. The reason for this is homopolyisoprene bleeds to the surface of adhesive formulations. It would not be advantageous to eliminate altogether the I arms because some homopolymer I arms are necessary to bestow reasonable tack properties to the polymer. This is important if the polymer is to be used in an adhesive formulation. It is not as important if the polymer is to be used in some other application, such as impact modification of other polymers.

As stated above, one way of varying the properties of the polymers produced is to vary the molar ratio of SI to I arms. Other variables which are important in determining the properties of the final statistically coupled blend of polymers are the relative molecular weights of the isoprene blocks in the SI and I arms, the total number of arms and the overall polystyrene content of the polymer. Generally, it is best to operate within an SI:I molar ratio of from 2:1 to 1:2 to ensure that less than 0.5 percent weight homopolyisoprene will be formed. Further, the $SI_1:I_2$ isoprene relative molecular weight should vary from 10:1 to 1:10 to ensure adequate strength of the adhesive composition. Herein, the number of arms should be 6 or 8. Ten to 30 arm radials are generally too hard to process to be useful as described herein. Less than 5 percent homopolymer cannot be achieved when the number of arms is 4. The polystyrene content may range from 5 percent to 35 percent to ensure that the resultant polymer composition has adequate tack.

In order to achieve a desired balance of SI and I arms in the final coupled polymer blend, the amount of SI and I arms and their molecular weights can be determined by using the following equations. For the average polymer composition:

$$(SI_1)_x(I_2)_y$$

Where each unique polymer component of the statistically coupled product is designated as:

$$(SI_1)_{x^i}(I_2)_y$$

The weight fraction of a given polymer component is given by the following equations: where $MWI_1$ and $MWI_2$ designate the molecular weights of the two isoprene arms and PS weight fraction designate the polystyrene weight fraction of the total polymer composition. x and y are the average number of $SI_1$, and $I_2$ arms in a single coupled polymer respectively. i is a subscript used to denote the $i^{th}$ unique combination of x and y. In general:

$$\text{Wt. Fract. } (I_2)_{(x+y)} = \text{Mole Fract. } (I_2)_{(x+y)} \left[ \frac{[(x+y) \cdot (MWI_2)]}{\left(\frac{PS \text{ Wt. Fract.}}{1 - PS \text{ Wt. Fract.}} + 1\right)[x(MWI_1) + y(MWI_2)]} \right] \quad (2)$$

Wt. Fract. $(SI_1)_{x_i}(I_2)_{y_i} =$ $$\text{Mole Fract. } (SI_1)_{x_i}(I_2)_{y_i} \left[ \frac{x_i\left(\frac{PS \text{ Wt. Fract.}}{x(1 - PS \text{ Wt. Fract.})}\right)}{\left(\frac{PS \text{ Wt. Fract.}}{1 - PS \text{ Wt. Fract.}} + 1\right)} + \frac{[x_i(MWI_1) + y_i(MWI_2)]}{\left(\frac{PS \text{ Wt. Fract.}}{1 - PS \text{ Wt. Fract.}} + 1\right)[x(MWI_1) + y(MWI_2)]} \right]$$

For the case where $MWI_1 = MWI_2 = MWI$:

Wt. Fract. $(SI_1)_{x_i}(I_2)_{y_i} =$ $$\text{Mole Fract. } (SI_1)_{x_i}(I_2)_{y_i} \left[ \frac{x_i\left(\frac{PS \text{ Wt. Fract.}}{x(1 - PS \text{ Wt. Fract.})} + 1\right)}{\left(\frac{PS \text{ Wt. Fract.}}{1 - PS \text{ Wt. Fract.}} + 1\right)} \right]$$

For the case where $MWI_1 = 2 \times MWI_2$

Wt. Fract. $(SI_1)_{x_i}(I_2)_{y_i} =$ $$\text{Mole Fract. } (SI_1)_{x_i}(I_2)_{y_i} \left[ \frac{x_i\left(\frac{PS \text{ Wt. Fract.}}{x(1 - PS \text{ Wt. Fract.})}\right)}{\left(\frac{PS \text{ Wt. Fract.}}{1 - PS \text{ Wt. Fract.}} + 1\right)} + \frac{(2x_i + y_i)}{\left(\frac{PS \text{ Wt. Fract.}}{1 - PS \text{ Wt. Fract.}} + 1\right)(2x + y)} \right]$$

Where the mole fraction of each polymer component is given by:

Mole Fract. $(SI_1)_{x_i}(I_2)_{y_i} =$ $$\left(\frac{[SI_1]}{[SI_1] + [I_2]}\right)^{x_i} \left(\frac{[I_2]}{[SI_1] + [I_2]}\right)^{y_i} \left(\frac{(x_i + y_i)!}{x_i! y_i!}\right)$$

and $[SI_1]$ and $[I_2]$ refer to the relative molar concentrations.

Specifically, the weight fraction of homopolyisoprene (designated as $I_{x+y}$) is given by the following equations: In general:

For the case where $MWI_1 = MWI_2 = MWI$:

$$\text{Wt. Fract. } (I_2)_{x+y} = \text{Mole Fract. } (I_2)_{x+y} \left[ \frac{1}{\left(\frac{PS \text{ Wt. Fract.}}{1 - PS \text{ Wt. Fract.}} + 1\right)} \right]$$

For the case where $MWI_1 = 2 \times MWI_2$ $$\text{Wt. Fract. } (I_2)_{x+y} = \text{Mole Fract. } (I_2)_{x+y} \left[ \frac{(x+y)}{\left(\frac{PS \text{ Wt. Fract.}}{1 - PS \text{ Wt. Fract.}} + 1\right)(2x+y)} \right]$$

Where the mole fraction of homopolyisoprene is given by:

$$\text{Mole Fract. } (I_2)_{x+y} = \left(\frac{[I_2]}{[SI_1] + [I_2]}\right)^{x+y}$$

It is important to note that this feature of being able to obtain an asymmetric radial polymer which has so little homopolyisoprene (HPI) by the one step method of the present invention cannot be obtained when polyfunctional coupling agents having lesser amounts of functionality are used. For instance, silicon tetrachloride, which is commonly used, or any of the related tetrafunctional coupling agents cannot achieve this result. A statistical analysis using the above formulae was performed for a polymer having a total of four arms composed of both S-I arms and isoprene arms. As can be seen by reviewing the following tables, the amount of homopolyisoprene which can be expected is above 5 percent, an unacceptably high level for adhesive applications. Table 1 shows the statistical analysis for four armed statistically coupled polymer blends having a polystyrene mole fraction of 0.15 (15 percent) for SI/I arm ratios of 1/1, 1/1.5, 1/2 and 1/3. Table 2 shows a similar statistical analysis for four armed radial polymers having a polystyrene mole fraction of 0.2 (20 percent).

For comparative purposes, Tables 3 and 4 are provided. Table 3 shows a similar statistical analysis for six armed radial polymers having a polystyrene mole fraction of 0.15 and arm ratios of 1/1, 1/1.5, 1/2 and 1/3. Table 4 shows the same type of statistical analysis for a six arm radial polymer having a polystyrene mole fraction of 0.2. It can be seen that none of the four arm polymers produce a homopolyisoprene weight fraction of less than 5 percent (0.05 weight fraction). In contrast, the statistical analyses for the six arm polymers show that this goal can be achieved for many of the possible permutations, especially SI/I arm ratios of 1/1 and 1/1.5. In all cases, I1=I2 on the tables means that the molecular weights of both of the isoprene blocks in the polymer are the same.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrenedivinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pour sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

TABLE 1

POLYMER CALCULATIONS FOR 4-ARM POLYMERS
PS mole fraction 0.15

| NUMBER OF HPI ARMS | NUMBER OF S-I ARMS | POLYMER MOLE FRACTION | POLYMER WEIGHT FRACTION |
|---|---|---|---|
| (SI/I ARM RATIO = 1/1) | | | |
| RATIO SI:I | 2/2 | | \|1 = \|2 |
| 0 | 4 | 0.0625 | 0.0719 |
| 1 | 3 | 0.2500 | 0.2688 |
| 2 | 2 | 0.3750 | 0.3750 |
| 3 | 1 | 0.2500 | 0.2313 |
| 4 | 0 | 0.0625 | 0.0531 |
| | | 1.00 | 1.00 |
| (SI/I ARM RATIO = 1/1.5) | | | |
| RATIO SI:I | 1.6/2.4 | | \|1 = \|2 |
| 0 | 4 | 0.0256 | 0.0314 |
| 1 | 3 | 0.1536 | 0.1738 |
| 2 | 2 | 0.3456 | 0.3586 |
| 3 | 1 | 0.3456 | 0.3262 |
| 4 | 0 | 0.1296 | 0.1102 |
| | | 1.00 | 1.00 |
| (SI)/I ARM RATIO = 1/2 | | | |
| RATIO SI:I | 1.33/2.67 | | \|1 = \|2 |
| 0 | 4 | 0.0122 | 0.0159 |
| 1 | 3 | 0.0981 | 0.1166 |
| 2 | 2 | 0.2956 | 0.3179 |
| 3 | 1 | 0.3956 | 0.3808 |
| 4 | 0 | 0.1985 | 0.1687 |
| | | 1.00 | 1.00 |
| (SI)/I ARM RATIO = 1/3 | | | |
| RATIO SI:I | 1/3 | | \|1 = \|2 |
| 0 | 4 | 0.0039 | 0.0057 |
| 1 | 3 | 0.0469 | 0.0609 |
| 2 | 2 | 0.2109 | 0.2426 |
| 3 | 1 | 0.4219 | 0.4219 |

TABLE 1-continued

POLYMER CALCULATIONS
FOR 4-ARM POLYMERS
PS mole fraction 0.15

| NUMBER OF HPI ARMS | NUMBER OF S-I ARMS | POLYMER MOLE FRACTION | POLYMER WEIGHT FRACTION |
|---|---|---|---|
| 4 | 0 | 0.3164 | 0.2689 |
|   |   | 1.00 | 1.00 |

TABLE 2

POLYMER CALCULATIONS
FOR 4-ARM POLYMERS
PS mole fraction 0.20

| NUMBER OF HPI ARMS | NUMBER OF S-I ARMS | POLYMER MOLE FRACTION | POLYMER WEIGHT FRACTION |
|---|---|---|---|
| (SI/I ARM RATIO = 1/1) | | | |
| RATIO SI:I | 2/2 | | \|1 = \|2 |
| 0 | 4 | 0.0625 | 0.0750 |
| 1 | 3 | 0.2500 | 0.2750 |
| 2 | 2 | 0.3750 | 0.3750 |
| 3 | 1 | 0.2500 | 0.2250 |
| 4 | 0 | 0.0625 | 0.0500 |
|   |   | 1.00 | 1.00 |
| (SI/I ARM RATIO = 1/1.5) | | | |
| RATIO SI:I | 1.6/2.4 | | \|1 = \|2 |
| 0 | 4 | 0.0256 | 0.0333 |
| 1 | 3 | 0.1536 | 0.1805 |
| 2 | 2 | 0.3456 | 0.3629 |
| 3 | 1 | 0.3456 | 0.3197 |
| 4 | 0 | 0.1296 | 0.1037 |
|   |   | 1.00 | 1.00 |
| (SI)/I ARM RATIO = 1/2 | | | |
| RATIO SI:I | 1.33/2.67 | | \|1 = \|2 |
| 0 | 4 | 0.0122 | 0.0171 |
| 1 | 3 | 0.0981 | 0.1228 |
| 2 | 2 | 0.2956 | 0.3253 |
| 3 | 1 | 0.3956 | 0.3759 |
| 4 | 0 | 0.1985 | 0.1588 |
|   |   | 1.00 | 1.00 |
| (SI)/I ARM RATIO = 1/3 | | | |
| RATIO SI:I | 1/3 | | \|1 = \|2 |
| 0 | 4 | 0.0039 | 0.0063 |
| 1 | 3 | 0.0469 | 0.0656 |
| 2 | 2 | 0.2109 | 0.2531 |
| 3 | 1 | 0.4219 | 0.4219 |
| 4 | 0 | 0.3164 | 0.2531 |
|   |   | 1.00 | 1.00 |

TABLE 3

POLYMER CALCULATIONS
FOR 4-ARM POLYMERS
PS mole fraction 0.15

| NUMBER OF HPI ARMS | NUMBER OF S-I ARMS | POLYMER MOLE FRACTION | POLYMER WEIGHT FRACTION |
|---|---|---|---|
| (SI/I ARM RATIO = 1/1) | | | |
| RATIO SI:I | 3/3 | | \|1 = \|2 |
| 0 | 6 | 0.0156 | 0.0180 |
| 1 | 5 | 0.0938 | 0.1031 |
| 2 | 4 | 0.2344 | 0.2461 |
| 3 | 3 | 0.3125 | 0.3125 |
| 4 | 2 | 0.2344 | 0.2227 |
| 5 | 1 | 0.0938 | 0.0844 |
| 6 | 0 | 0.0156 | 0.0133 |
|   |   | 1.00 | 1.00 |
| (SI/I ARM RATIO = 1/1.5) | | | |
| RATIO SI:I | 2.4/3.6 | | \|1 = \|2 |
| 0 | 6 | 0.0041 | 0.0050 |
| 1 | 5 | 0.0369 | 0.0429 |
| 2 | 4 | 0.1382 | 0.1521 |
| 3 | 3 | 0.2765 | 0.2868 |
| 4 | 2 | 0.3110 | 0.3033 |
| 5 | 1 | 0.1866 | 0.1703 |
| 6 | 0 | 0.0467 | 0.0397 |
|   |   | 1.00 | 1.00 |
| (SI)/I ARM RATIO = 1/2 | | | |

TABLE 3-continued
POLYMER CALCULATIONS FOR 4-ARM POLYMERS
PS mole fraction 0.15

| NUMBER OF HPI ARMS | NUMBER OF S-I ARMS | POLYMER MOLE FRACTION | POLYMER WEIGHT FRACTION |
|---|---|---|---|
| RATIO SI:I | 2/4 | | $\|1 = \|2$ |
| 0 | 6 | 0.0014 | 0.0018 |
| 1 | 5 | 0.0165 | 0.0202 |
| 2 | 4 | 0.0823 | 0.0947 |
| 3 | 3 | 0.2195 | 0.2359 |
| 4 | 2 | 0.3292 | 0.3292 |
| 5 | 1 | 0.2634 | 0.2436 |
| 6 | 0 | 0.0878 | 0.0746 |
| | | 1.00 | 1.00 |
| (SI)/I ARM RATIO = 1/3 | | | |
| RATIO SI:I | 1.5/4.5 | | $\|1 = \|2$ |
| 0 | 6 | 0.0002 | 0.0004 |
| 1 | 5 | 0.0044 | 0.0059 |
| 2 | 4 | 0.0330 | 0.0412 |
| 3 | 3 | 0.1318 | 0.1516 |
| 4 | 2 | 0.2966 | 0.3115 |
| 5 | 1 | 0.3560 | 0.3382 |
| 6 | 0 | 0.1780 | 0.1513 |
| | | 1.00 | 1.00 |

TABLE 4
POLYMER CALCULATIONS FOR 4-ARM POLYMERS
PS mole fraction 0.20

| NUMBER OF HPI ARMS | NUMBER OF S-I ARMS | POLYMER MOLE FRACTION | POLYMER WEIGHT FRACTION |
|---|---|---|---|
| (SI/I ARM RATIO = 1/1) | | | |
| RATIO SI:I | 3/3 | | $\|1 = \|2$ |
| 0 | 6 | 0.0156 | 0.0188 |
| 1 | 5 | 0.0938 | 0.1063 |
| 2 | 4 | 0.2344 | 0.2500 |
| 3 | 3 | 0.3125 | 0.3125 |
| 4 | 2 | 0.2344 | 0.2188 |
| 5 | 1 | 0.0938 | 0.0813 |
| 6 | 0 | 0.0156 | 0.0125 |
| | | 1.00 | 1.00 |
| (SI/I ARM RATIO = 1/1.5) | | | |
| RATIO SI:I | 2.4/3.6 | | $\|1 = \|2$ |
| 0 | 6 | 0.0041 | 0.0053 |
| 1 | 5 | 0.0369 | 0.0449 |
| 2 | 4 | 0.1382 | 0.1567 |
| 3 | 3 | 0.2765 | 0.2903 |
| 4 | 2 | 0.3110 | 0.3007 |
| 5 | 1 | 0.1866 | 0.1649 |
| 6 | 0 | 0.0467 | 0.0373 |
| | | 1.00 | 1.00 |
| (SI)/I ARM RATIO = 1/2 | | | |
| RATIO SI:I | 2/4 | | $\|1 = \|2$ |
| 0 | 6 | 0.0014 | 0.0019 |
| 1 | 5 | 0.0165 | 0.0214 |
| 2 | 4 | 0.0823 | 0.0988 |
| 3 | 3 | 0.2195 | 0.2414 |
| 4 | 2 | 0.3292 | 0.3292 |
| 5 | 1 | 0.2634 | 0.2370 |
| 6 | 0 | 0.0878 | 0.0702 |
| | | 1.00 | 1.00 |
| (SI)/I ARM RATIO = 1/3 | | | |
| RATIO SI:I | 1.5/4.5 | | $\|1 = \|2$ |
| 0 | 6 | 0.0002 | 0.0004 |
| 1 | 5 | 0.0044 | 0.0064 |
| 2 | 4 | 0.0330 | 0.0439 |
| 3 | 3 | 0.1318 | 0.1582 |
| 4 | 2 | 0.2966 | 0.3164 |
| 5 | 1 | 0.3560 | 0.3322 |
| 6 | 0 | 0.1780 | 0.1424 |
| | | 1.00 | 1.00 |

Figure 1:
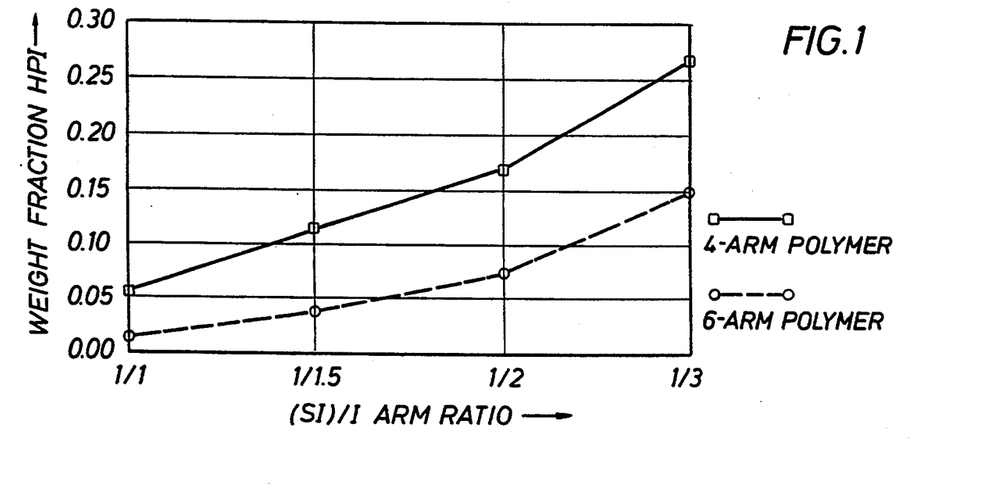
FIGS. 1, 2 and 3 are plots of the weight fraction of homopolyisoprene versus the SI/I arm ratio for 4 arm and 6 arm polymers at different polystyrene contents and, in the case of FIGS. 2 and 3, different isoprene block molecular weights.
Figure 2:
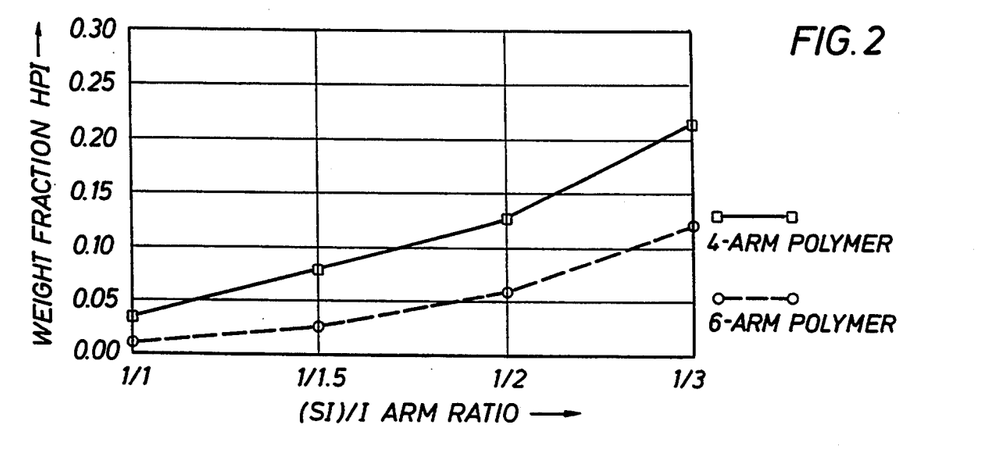
Figure 3:
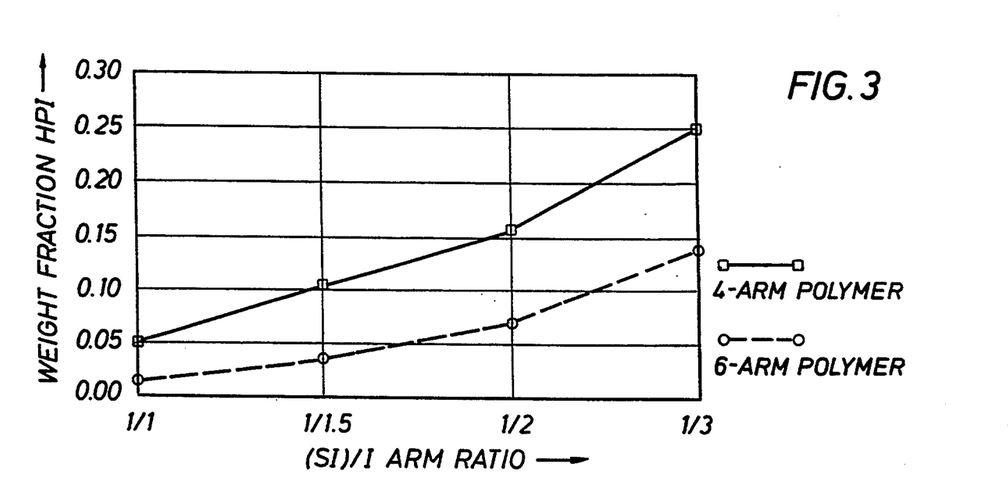

These results are shown graphically in FIGS. 1, 2 and 3 wherein the weight fraction of homopolyisoprene is plotted versus the SI/I arm ratio for four arm and six arm polymers at different relative polystyrene contents and, in the case of FIGS. 2 and 3, different isoprene block molecular weights. Each of the graphs has a line drawn across at 0.05 weight fraction HPI so it can be seen clearly which SI/I arm ratios are acceptable to achieve the goal of less than 0.05 homopolyisoprene. Six arm polymers with a SI/I arm ratios of greater than about 1/2 are not particularly useful for the polymer compositions shown since the weight fraction of homopolyisoprene (HPI) is too high to afford useful adhesive compositions.

It is important that the molar ratio of the SI arms to that of the I arms be sufficient to produce a statistical blend with less than five weight percent homopolyisoprene. As can be seen by comparing FIGS. 1, 2 and 3, the minimum SI:I arm ratio varies depending upon the polystyrene content, the relative molecular weights of the isoprene blocks and the total number of polymeric arms. The minimums are represented by the intersection of the line at 0.05 weight fraction HPI and the plot for the six armed polymers. Lower ratios than shown in those figures are possible if the relative molecular weights are altered so that the $I_1$ molecular weight is increased and the $I_2$ molecular weight is decreased such that less than 5 percent HPI will be formed or an eight armed radial statistical polymer blend is made. However, generally, the SI:I arm ratio should be less than about 1:2.

The statistical nature of the coupling reaction to afford the expected distribution of polymer components has been verified experimentally in the manner described below.

Figure 4:
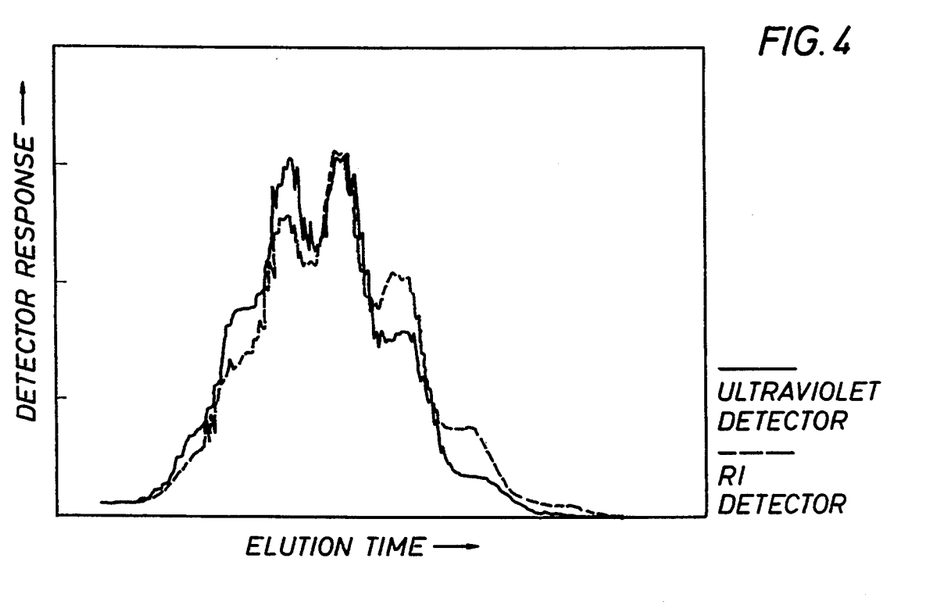
FIG. 4 is a GPC curve of the 6 arm asymmetric radial polymer described in Example 3 showing the responses of the ultraviolet and RI detectors.
Figure 5:
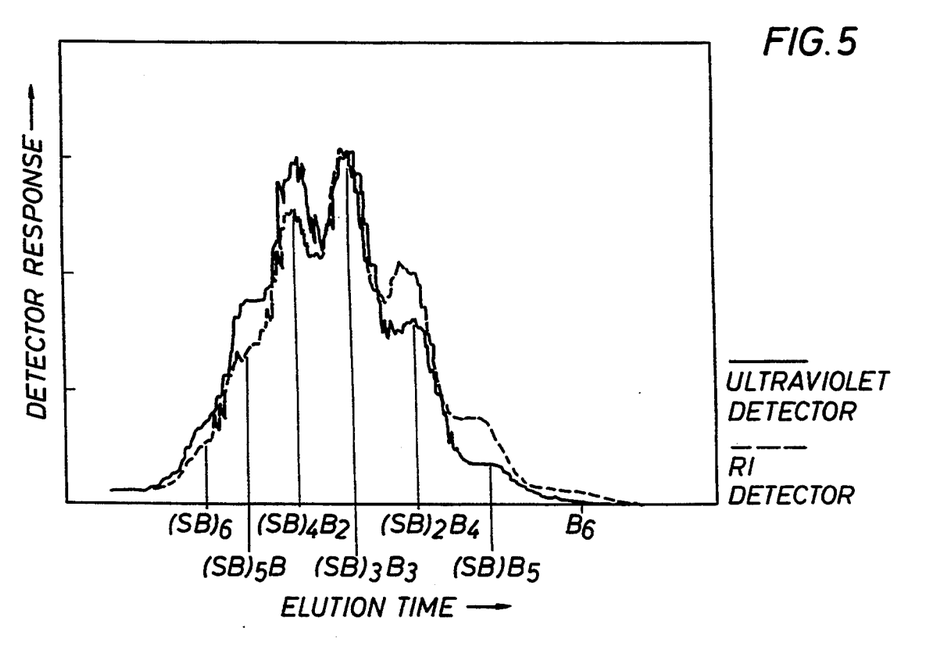
FIG. 5 is the same plot as FIG. 4 but identifying the peaks of the different 6 arm polymers produced in the statistical blend of Example 3.

Gel permeation chromatography (GPC) was performed on the polymer described in Example 3. The responses of two different detectors at the times of elution of the six-arm polymer components are shown in FIG. 4. The Ultraviolet (UV) detector detects the polystyrene present in the polystyrene-polybutadiene polymer arms. A higher absorbance indicates a larger amount of polystyrene is present. The RI detector detects mass and, therefore, will detect both types of polymer arms. A higher absorbance indicates that more polymer is eluting at that time. Seven peaks are seen corresponding to the expected polymer components. The peaks can be assigned to individual polymer components basis the relative elution times, which scales inversely with molecular weight. The highest molecular weight peak should be $(SB)_6$ while the lowest molecular weight peak should be $(B)_6$. Examination of the relative intensities of the curves for the UV and RI detectors allows for confirmation of this assignment. The RI detector peak at lowest molecular weight (highest elution time) shows no absorption in the UV, and hence can be assigned to the $(B)_6$ component (contains no polystyrene and, hence, does not absorb in the UV). As one goes to higher molecular weights, the intensity of the UV peaks increases to the point where the UV peak is more intense than the RI peak—$(SB)_4B_2$, $(SB)_5B$, and $(SB)_6$. The assignments of the GPC peaks determined as discussed above are shown in FIG. 5.

To determine the molecular weight of the polymer components, the elution times were compared to that of a polystyrene standard. These polystyrene equivalent molecular weights were corrected for the difference in molecular volume between linear and branched molecules. The following expression of Zimm and Stockmayer ("The Dimensions of Chain Molecules Containing Branches and Rings", *J. Chem. Phys.*, 17, 1301 (1949)) relates the molecular dimensions of linear and singly branched (i.e., star-shaped) molecules:

$$g_o = \frac{<R_g^2 \text{ branched}>_o}{<R_g^2 \text{ linear}>_o} = \frac{(3f-2)}{f^2}$$

where $R_g$ is the radius of gyration and f is the number of arms in the star-shaped molecule. The above is developed for the case when no excluded volume effects are present (i.e., theta conditions). However, GPC is not performed at theta conditions but in a relatively "good" solvent. In this case, excluded volume effects will be important and the radius of gyration of the molecule in the good solvent is related to its theta condition radius by:

$$R_g^2 = (CvN^2 <R_g^2>_o)^{2/5}$$

where C is a group of constants, v is the excluded volume parameter, and N is the number of repeat units (P. G. de Gennes, *Scaling Concepts in Polymer Physics*, Cornell University Press, Ithaca (1979), p. 29). As a result, the contraction factor, g, in a good solvent is:

$$g = \left[ \frac{(3f-2)}{f^2} \right]^{2/5}$$

Using the above contraction factor, the apparent GPC molecular weight can be corrected for molecular architecture using:

$$M_{actual} = \left( \frac{1}{g} \right) * M_{apparent}$$

since $R_g^2 \sim M$ and further since the separation achieved in GPC is based upon molecular volume.

Figure 6:
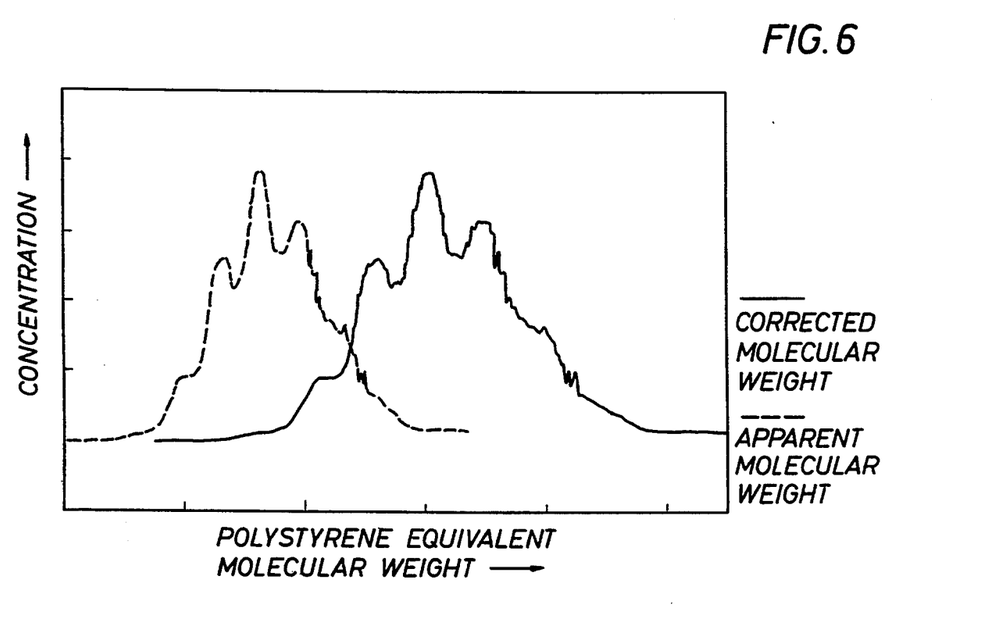
FIG. 6 shows the apparent and corrected polystyrene equivalent molecular weights for the RI detector response for the polymer of Example 3.

FIG. 6 shows the apparent and corrected polystyrene equivalent molecular weights for the RI detector response.

The RI detector curve was then normalized by first determining the % height of the individual polymer component peaks (using as a total the detector response height of each fraction and disregarding the height of the rest of the detector response). In this manner, seven correction factors were obtained (one for each polymer component peak) differing by no more than 1%. A correction factor to convert the RI detector response of the entire curve to % height was obtained by averaging these seven factors.

Using the equations for determination of the % mole of each polymer component, the expected polymer distribution on a weight basis was determined for this example using homopolymer and copolymer arm polystyrene equivalent molecular weights determined by GPC. Since the polymer arms are linear, an architectural correction factor is not needed for them.

Figure 7:
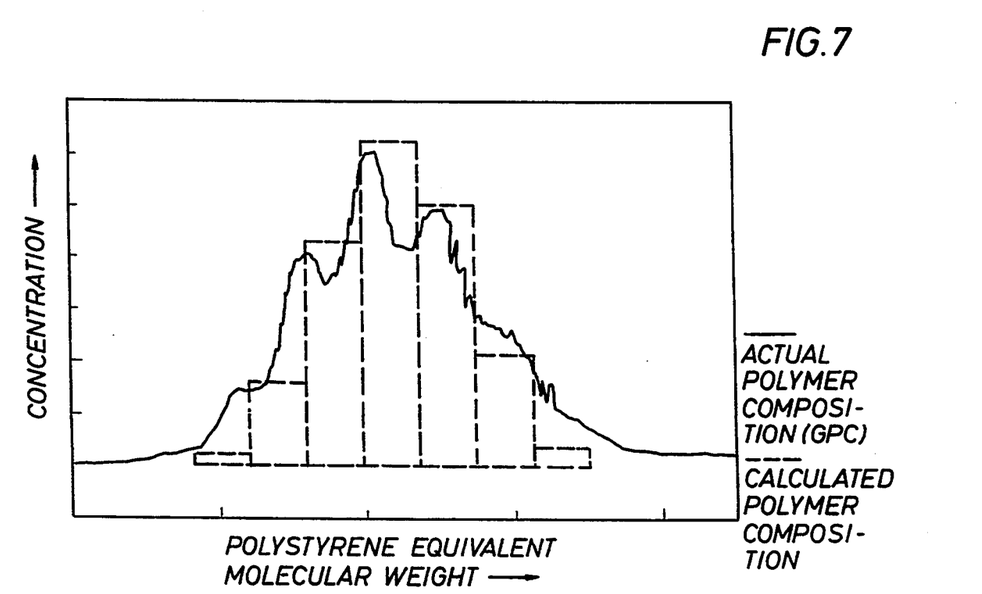
FIG. 7 is a comparison of the normalized GPC RI curve and the calculated polymer composition for the 6 arm asymmetric radial polymer.

FIG. 7 shows the comparison of the experimentally observed GPC curve with the histogram of the predicted polymer composition as shown in Table 5. As shown, the experimentally obtained data compares extremely favorably with that predicted. This verifies the statistical nature of the coupling process. Given this verification, the present methodology provides a predictive process for the construction of asymmetric radial polymers.

These polymers may be hydrogenated after they are coupled. They may also be partially hydrogenated such that one portion of the polymer is hydrogenated and another is not. For example, styrene-butadiene arms could be made as well as isoprene arms. It is possible to selectively hydrogenate the butadiene in the styrene-butadiene arms and not significantly hydrogenate the isoprene arms. The hydrogenation can take place in a selective manner with a suitable catalyst and conditions like those described in U.S. Pat. No. Re. 27,145, U.S. Pat. No. 4,001,199 or with a titanium catalyst such as disclosed in U.S. Pat. No. 5,039,755, all of which are incorporated herein by reference.

The asymmetric radial polymers of this invention may be used in any of the applications for which asymmetric radial polymers having the same relative arm structure can be used. Suitable end use applications, then, include impact modification of engineering thermoplastics, impact modification of unsaturated thermosetting polyesters, adhesives, asphalt modification, and the like.

TABLE 5

Calculated Molecular Weight and Concentration of Polymer Components for the Polymer Composition Described in Example 3.

| Polymer Component | Component Molecular Weight ($10^3$ g/mole)[a] | Component Concentration (Mole %)[b] | Component Concentration (Weight %)[c] |
|---|---|---|---|
| $(SB)_6$ | 631.2 | 1.56 | 1.9 |
| $(SB)_5B$ | 593.08 | 9.38 | 10.8 |
| $(SB)_4(B)_2$ | 554.96 | 23.44 | 25.2 |
| $(SB)_3(B)_3$ | 516.84 | 31.25 | 31.3 |
| $(SB)_2(B)_4$ | 478.72 | 23.44 | 21.7 |
| $SB(B)_5$ | 440.6 | 9.38 | 8.0 |
| $(B)_6$ | 402.48 | 1.56 | 1.2 |

[a] Polystyrene equivalent molecuar weight as determined by the appropriate sum of the individual polymer arm molecular weights. The arm molecular weights (determined by GPC and comparison to linear polystyrene standards) are polybutadiene arm = 67.08 g/mole, polystyrene-b-polybutadiene arm = 105.2 g/mole.
[b] Determined using the formula given on page 14 line 2.
[c] Determined using the following equation:

$$\left( \frac{MWC_i \cdot \text{Mole Fraction } C_i}{\Sigma(MWC_i \cdot \text{Mole Fraction } C_i)} \right) \cdot 100$$

where $C_i$ refers to the individual polymer components.

EXAMPLE 1

443.7 grams of cyclohexane were introduced into a 1 liter reactor. 19.0 grams of styrene was added along with 1.36 millimoles of sec-butyllithium. The polymerization was carried out for 30 minutes at 50° C. Next, an additional 1.36 millimoles of sec-butyllithium was added along with 70.6 grams of isoprene. This mixture was allowed to polymerize at 60° C. for one hour. This formed a mixture of styrene-isoprene and polyisoprene arms in a ratio of 3:3. Next, 0.29 mmoles of the coupling agent, hexachlorodisiloxane, and 0.53 milliliters of diethoxyethane (dioxo) were added and the coupling reaction was allowed to take place at 80° C. for one hour. The reaction was terminated with 5 millimoles of methanol. The solution was coagulated with isopropyl alcohol. Five grams was dissolved in 50 milliliters of tetrahydrofuran and cast into a 4 inch by 4 inch film.

The GPC analysis and results of testing on the film are shown in Tables 6 and 7.

EXAMPLE 2

The procedure of Example 1 was used herein with the following noted changes. Approximately 2250 milliliters of cyclohexane, 60 g of styrene and 2.5 millimoles of sec-butyllithium were used in the polymerization of the polystyrene. 1.25 millimoles of sec-butyllithium and 141.6 grams of butadiene were used in the second polymerization step. The coupling agent was bis(trichlorosilylethane) and 0.625 millimoles of it were used in the coupling reaction. 0.185 milliliters of orthodimethoxybenzene was added, and the coupling reaction was allowed to take place at 80° C. for one hour.

The GPC analysis and results of testing the film are shown in Tables 6 and 7.

EXAMPLE 3

The procedure of Example 1 was used herein with the following noted changes. Approximately 2205 milliliters of cyclohexane, 54 g of styrene and 1.8 millimoles of sec-butyllithium were used in the polymerization of the polystyrene. 1.8 millimoles of sec-butyllithium and 126 grams of butadiene were used in the second polymerization step. The coupling agent was bis(trichlorosilylethane) and 0.6 millimoles of it were used in the coupling reaction. 2.14 milliliters of ethylene glycol diethyl ether was added, and the coupling reaction was allowed to take place at 80° C. for one hour.

The GPC analysis and results of testing the film are shown in Tables 6 and 7.

EXAMPLE 4

The procedure of Example 1 was used herein with the following noted changes. Approximately 2205 milliliters of cyclohexane, 27.05 g of styrene and 1.8 millimoles of sec-butyllithium were used in the polymerization of the polystyrene. 1.8 millimoles of sec-butyllithium and 152.2 grams of butadiene were used in the second polymerization step. The coupling agent was bis(trichlorosilylethane) and 0.6 millimoles of it were used in the coupling reaction. 2.14 milliliters of ethylene glycol diethyl ether was added, the coupling reaction was allowed to take place at 80° C. for one hour.

The GPC analysis of the polymer is shown in Table 6.

TABLE 6

| | | Six-Arm Asymmetric Polymer Analysis (by GPC) | | |
|---|---|---|---|---|
| Example Number | Polymer Composition | Diblock Arm Molecular Weight ($10^3$ g/mole) | Homopolymer Arm Molecular Weight ($10^3$ g/mole) | Six-Arm Asymmetric Polymer Content (% w) |
| 1 | $(SI)_3I_3$ | 13.9–27 | 25.2 | 90.8 |
| 2 | $(SB)_4B_2$ | 37–73 | 72 | 87.7 |
| 3 | $(SB)_3B_3$ | 31–38 | 37 | 89.9 |
| 4 | $(SB)_3B_3$ | 22–63 | 59 | 91 |

TABLE 7

Stress/Strain Testing of Six-Arm Asymmetric Polymer

| Example Number | Ultimate Strength (psi) | Ultimate Elongation (%) | 100% Modulus (psi) | 300% Modulus (psi) | 500% Modulus (psi) |
|---|---|---|---|---|---|
| 1 | 314 ± 20 | 538 ± 24 | 100 ± 1 | 237 ± 3 | 334 ± 9 |
| 2 | 873 ± 72 | 961 ± 73 | 214 ± 4 | 306 ± 5 | 431 ± 7 |
| 3 | 1268 ± 53 | 1135 ± 29 | 211 ± 3 | 385 ± 1 | 585 ± 8 |

EXAMPLE 5

The following table compares the properties of the polymer of Example 1 with those of a 6 arm $(SI)_2I_4$, asymmetric radial polymer made according to European Patent Application 0,314,256. It can be seen that the polymer of the present invention has advantages in tensile strength and percent elongation over that asymmetric radial polymer while also having a lower solution viscosity which results in easier formulation and processing.

TABLE 8

| Polymer | PSC (%) | 25% Solids, 25° C. Toluene Solution Viscosity (cp) | Tensile Strength (psi) | Percent Elongation (%) |
|---|---|---|---|---|
| EP ARP | 21.3 | 90 ± 1 | 167 | 305 |
| Example 1 Polymer | 21.4 | 74 ± 1 | 314 ± 20 | 538 ± 24 |

We claim:

1. A process for producing an asymmetric radial block copolymer statistical blend comprised of radial polymers having 6 or 8 arms and comprised of arms of polyisoprene and/or a vinyl aromatic hydrocarbon and arms of a block copolymer of a vinyl aromatic hydrocarbon and isoprene, having a structure as follows:

$$(A_n\text{-}B_m)_x\text{-}Y\text{-}(C)_z$$

wherein A is a vinyl aromatic hydrocarbon polymer block, B and C are polymer blocks of polyisoprene, Y is a multifunctional coupling agent, x and z range from 0 to 6 or 8, x+z is 6 or 8, n and m are 0 or 1 and n+m is at least 1, wherein the blend contains less than 5% by weight of homopolyisoprene, which comprises:

(a) sequentially anionically polymerizing a vinyl aromatic hydrocarbon and isoprene to create living arms comprised of polyvinyl aromatic hydrocarbon blocks and polyisoprene blocks, (b) anionically polymerizing isoprene and/or vinyl aromatic hydrocarbon to create living polyisoprene arms and/or vinyl aromatic hydrocarbon arms, and (c) coupling the arms of (a) and (b) together in one step with a coupling agent that will couple six or eight arms, wherein the molar ratio of the arms of (a) and (b) is sufficient to produce a statistical blend with less than 5 weight percent homopolyisoprene.

2. The process of claim 1 wherein the coupling agent is selected from the group consisting of bis-trimethoxysilylethane, hexachlorodisiloxane, bis-trichlorosilylethane, 1,6-bis(trichlorosilyl)hexane, hexachlorotriphosphazine, and octachlorotrisiloxane.

3. The process of claim 1 wherein the molar ratio in step (c) is less than 1:2.

4. The product of the process of claim 1.

5. A process for producing an asymmetric radial block copolymer statistical blend comprised of radial polymers having 6 or 8 arms and comprised of arms of polyisoprene and/or a vinyl aromatic hydrocarbon and arms of a block copolymer of a vinyl aromatic hydrocarbon and isoprene, having a structure as follows:

$$(A_n\text{-}B_m)_x\text{-}Y\text{-}(C)_z$$

wherein A is a vinyl aromatic hydrocarbon polymer block, B and C are polymer blocks of polyisoprene, Y is a multifunctional coupling agent, x and z range from 0 to 6 or 8, x+z is 6 or 8, n and m are 0 or 1 and n+m is at least 1, wherein the blend contains less than 5% by weight of homopolyisoprene, which comprises:

(a) sequentially anionically polymerizing a vinyl aromatic hydrocarbon and isoprene to create living arms comprised of polyvinyl aromatic hydrocarbon blocks and polyisoprene blocks, (b) anionically polymerizing isoprene and/or vinyl aromatic hydrocarbon to create living polyisoprene arms and/or vinyl aromatic hydrocarbon arms, and (c) coupling the arms of (a) and (b) together in one step with a coupling agent that will couple six or eight arms, wherein the molar ratio of the arms of (a) and (b) is sufficient to produce a statistical blend with less than 5 weight percent homopolyisoprene and is determined by the formula:

$$5\% > \text{Wt. Fract. } (I_2)_{(x+y)} = \left( \frac{[I_2]}{[SI_1] + [I_2]} \right)^{(x+y)} \cdot$$

$$\left[ \frac{[(x+y) \cdot (MWI_2)]}{\left( \frac{PS \text{ Wt. Fract.}}{1 - PS \text{ Wt. Fract.}} + 1 \right)[x(MWI_1) + y(MWI_2)]} \right]$$

wherein I is the polyisoprene block, SI is the arm having a block of a vinyl aromatic hydrocarbon and a block of isoprene, PS is a polyvinylaromatic hydrocarbon, $MWI_1$ and $MWI_2$ designate the molecular weights of the two isoprene arms, x and y are the average number of SI and I arms in a single coupled polymer, respectively, and the subscripts i are used to denote the $i^{th}$ unique combination of x and y.

* * * * *